US011714159B2

(12) United States Patent
Mackay

(10) Patent No.: US 11,714,159 B2
(45) Date of Patent: Aug. 1, 2023

(54) COOPERATIVE TARGET POSITIONING SYSTEM

(71) Applicant: Donald M. Mackay, Alexandria, VA (US)

(72) Inventor: Donald M. Mackay, Alexandria, VA (US)

(*) Notice: Subject to any disclaimer, the term of this patent is extended or adjusted under 35 U.S.C. 154(b) by 0 days.

(21) Appl. No.: 17/983,285

(22) Filed: Nov. 8, 2022

(65) Prior Publication Data
US 2023/0141969 A1 May 11, 2023

Related U.S. Application Data

(66) Substitute for application No. 63/277,688, filed on Nov. 10, 2021.

(51) Int. Cl.
G01S 3/02 (2006.01)
G01S 5/04 (2006.01)
G01S 5/02 (2010.01)
G01S 1/54 (2006.01)

(52) U.S. Cl.
CPC .............. G01S 5/04 (2013.01); G01S 5/0231 (2013.01); G01S 1/54 (2013.01)

(58) Field of Classification Search
CPC .............. G01S 5/04; G01S 5/0231; G01S 1/54
USPC ........................................ 342/463, 450, 451
See application file for complete search history.

(56) References Cited

U.S. PATENT DOCUMENTS

| 8,723,648 B2* | 5/2014 | Attew ...................... G01S 5/14 340/10.1 |
| 9,037,194 B2* | 5/2015 | Rosenbaum .......... G01S 13/878 455/562.1 |
| 9,689,955 B2* | 6/2017 | Rosenbaum .............. G01S 3/46 |
| 10,698,076 B2* | 6/2020 | Jones .................. G01S 5/02524 |
| 2010/0309056 A1* | 12/2010 | Rofougaran ........... H01Q 13/22 342/417 |
| 2016/0363648 A1* | 12/2016 | Mindell .................. G01S 7/003 |
| 2019/0272676 A1* | 9/2019 | Finn ........................ G06F 30/20 |

OTHER PUBLICATIONS

"The Ins and Out of An Indoor Positioning System", Link Labs, https://www.airfinder.com/blog/indoor-positioning-system (Aug. 16, 2018).
Morlas, "Electronic Engineer at Bitbrain", Neurotechnology—Business & Marketing, https://www.bitbrain.com/blog/indoor-positioning-system (May 27, 2020).
Mautz, "Overview of current indoor positioning systems", Geodezija ir Kartografija, 35:1, , pp. 18-22, https://www.tandfonline.com/doi/pdf/10.3846/1392-1541.2009.35.18-22 (Aug. 3, 2012).

(Continued)

Primary Examiner — Chuong P Nguyen
(74) Attorney, Agent, or Firm — Nixon & Vanderhye P.C.

(57) ABSTRACT

A system provides a way to determine angle of bearing to a target receiver/transmitter relative to plural beacon stations with rotating directional radiation patterns. The target is "cooperative" in that it transmits a "report" message when the target receives maximum signal strength from a beacon station. Triangulation from multiple beacon transmitter sites can be used to determine the target's position.

13 Claims, 17 Drawing Sheets

Multi-Target Positioning System

(56) References Cited

OTHER PUBLICATIONS

"Precise (±2cm) Indoor Positioning System for autonomous robots, drones, vehicles and humans", Marvelmind robotics, https://marvelmind.com/ (Sep. 2021).
"A Comprehensive Guide to Asset Tracking Technologies (2021)", https://www.wisersystems.com/blog/asset-tracking-technologies-comprehensive-guide 24 pages (2021).
"Indoor Positioning with Bluetooth Low Energy (BLE)", https://www.iotforall.com/indoor-positioning-bluetooth-low-energy-ble, 3 pages (Jan. 4, 2019).
Tosi et al., "Performance Evaluation of Bluetooth Low Energy: A Systematic Review", Sensors 54 pages (Dec. 13, 2017).
Li et al., "Study on the UWB location algorithm in the NLOS environment", Journal of Physics: Conference Series 2400 012043, IOP Publishing, 6 pages (2022).
Fan et al., "Integrated Navigation Fusion Strategy of INS/UWB for Indoor Carrier Attitude Angle and Position Synchronous Tracking", Scientific World Journal, 38 pages (Jul. 8, 2014).
Ridolfi et al., "Analysis of the Scalability of UWB Indoor Localization Solutions for High User Densities", Sensors 2018, 18(6), 1875; https://doi.org/10.3390/s18061875, 29 pages (Jun. 7, 2018).
"UWB vs Wi-Fi: which technology is better for indoor positioning", https://navigine.com/blog/uwb-vs-wifi/, 3 pages (Aug. 23, 2021).

\* cited by examiner

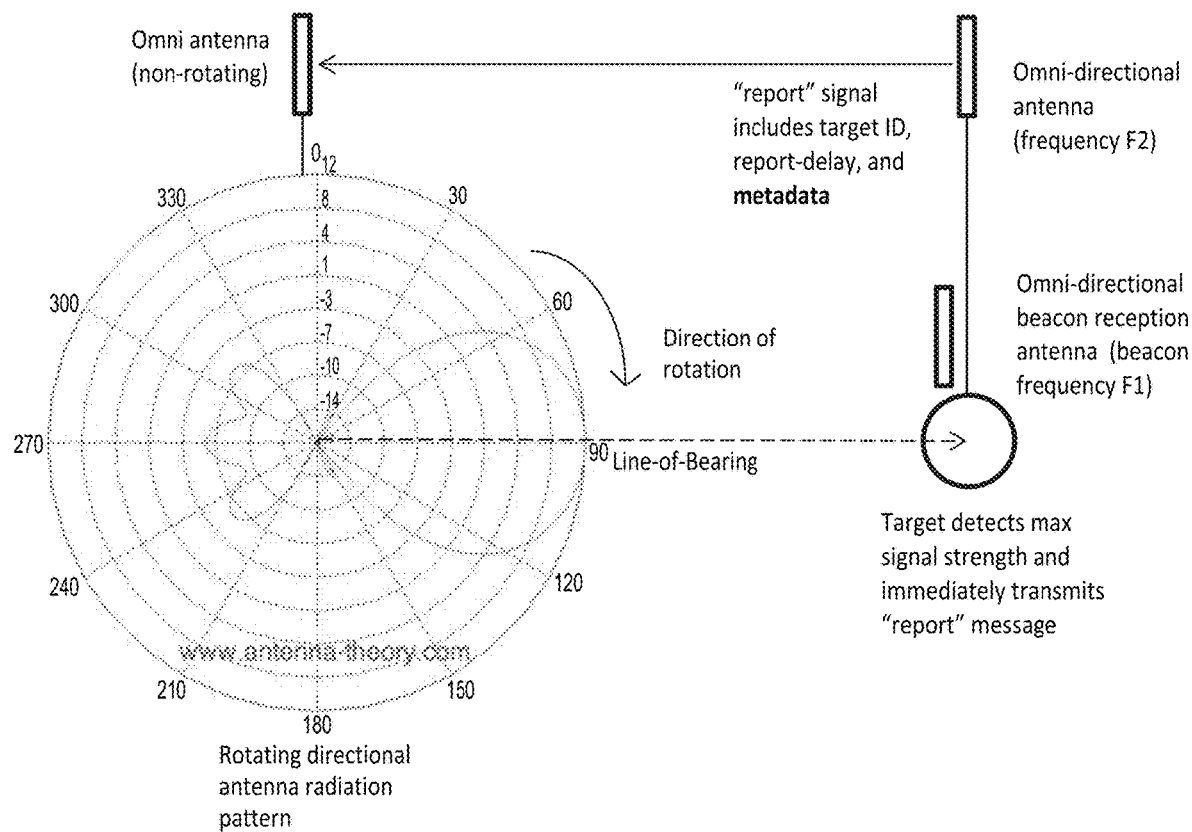
Figure 1 – Determination of Line-of-Bearing

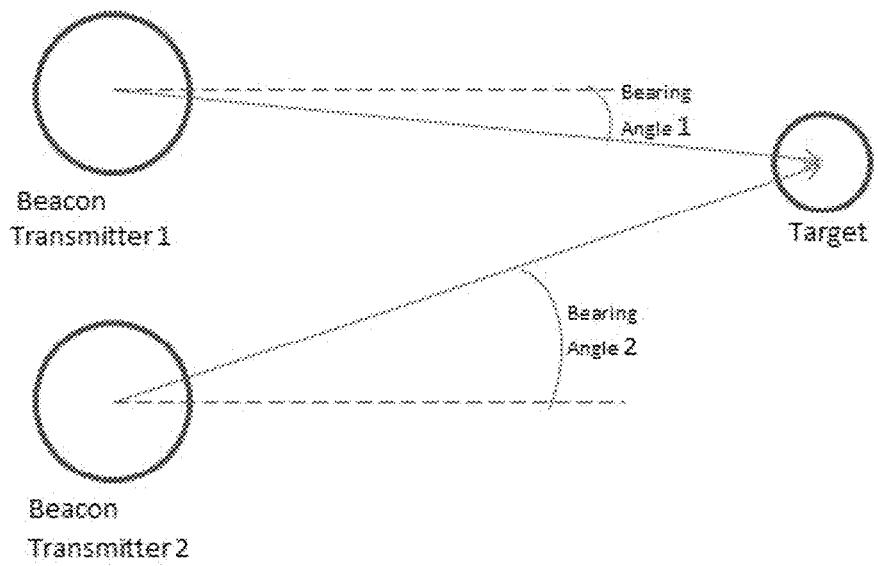
Figure 2: Position Determination

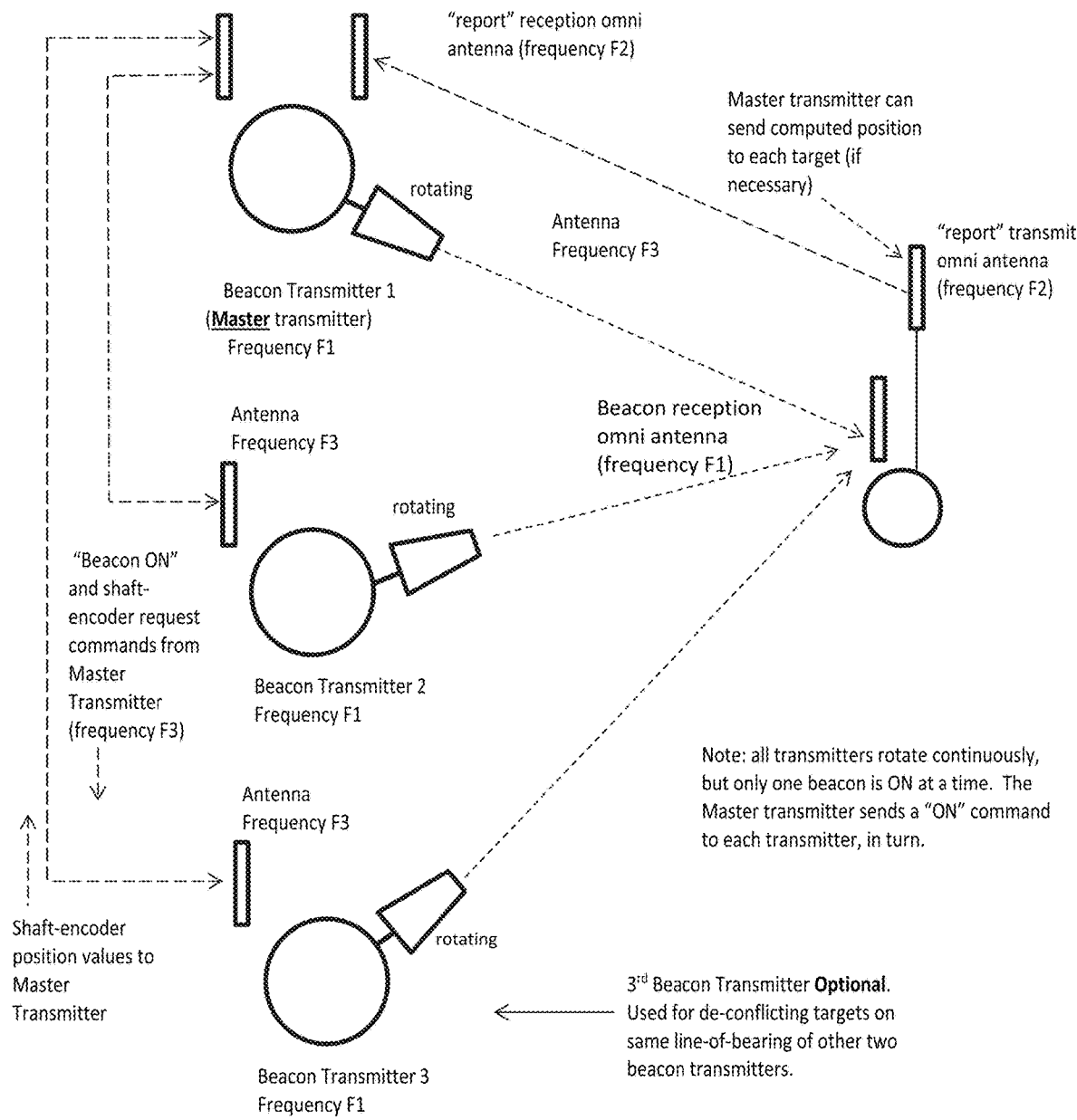
Figure 3: Multi-Target Positioning System

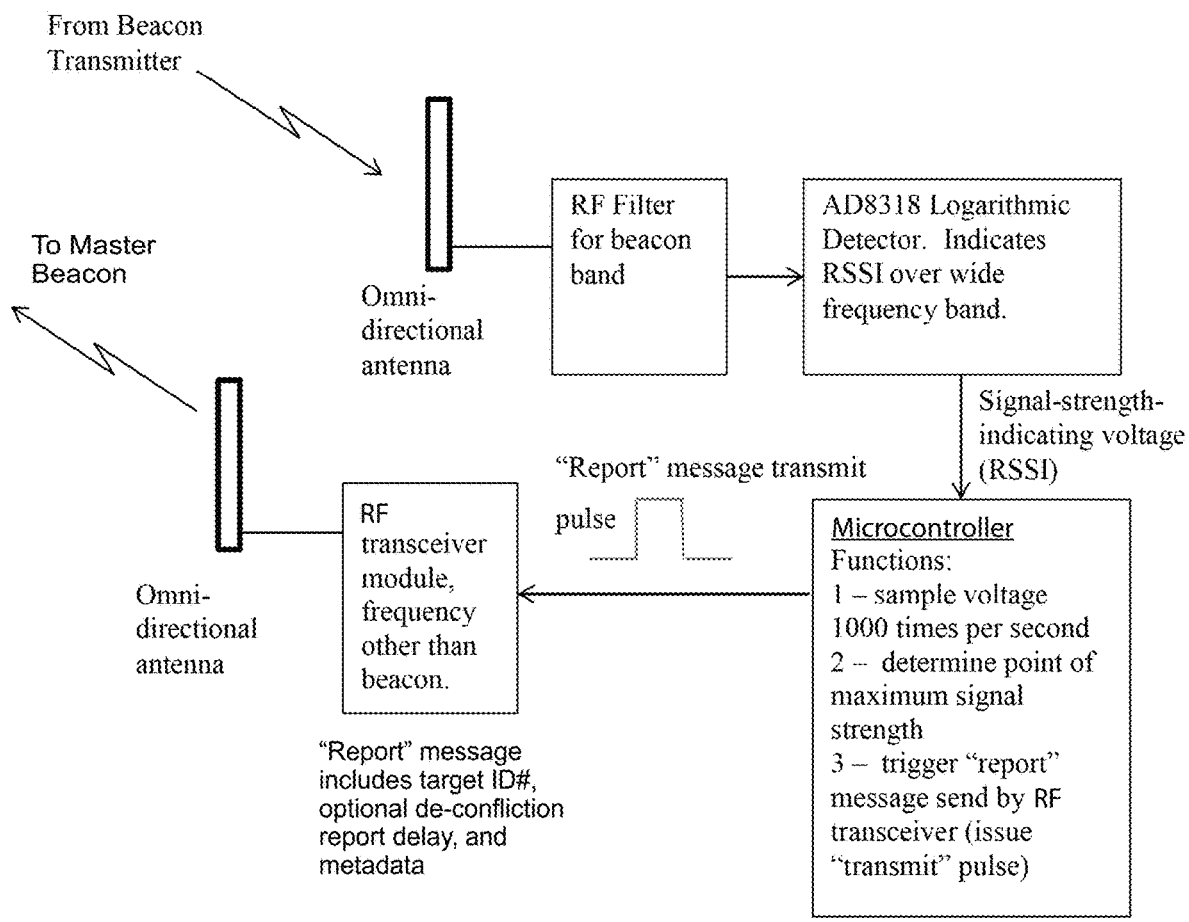
Figure 4: Target System

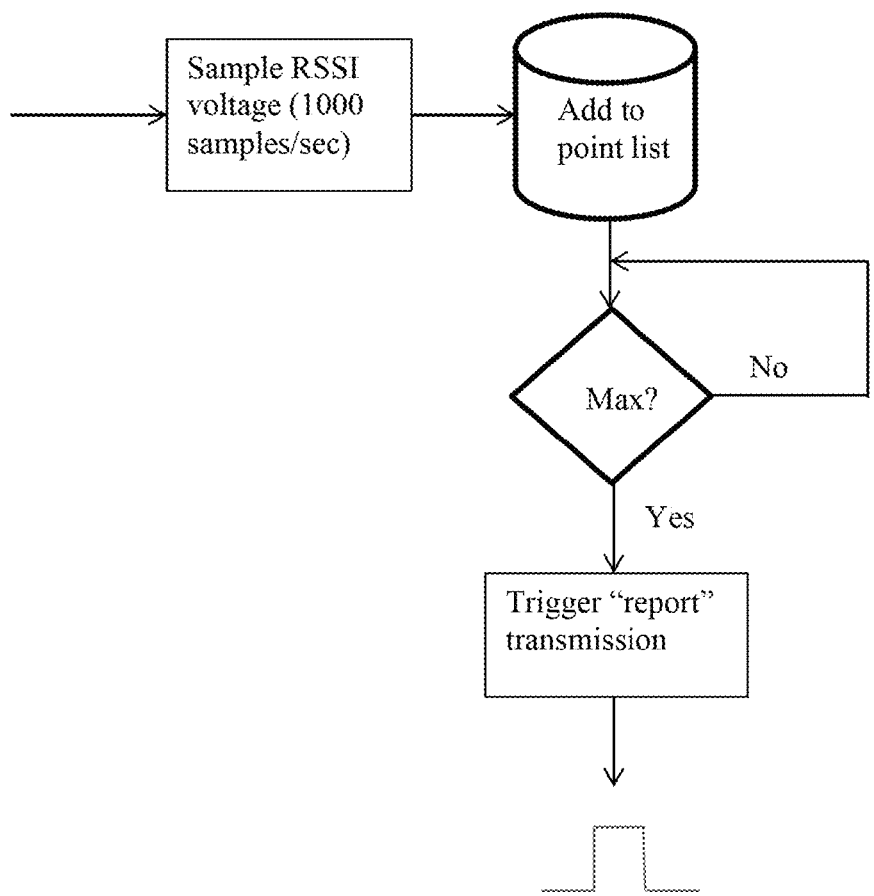
Figure 5: Target Processor Algorithm

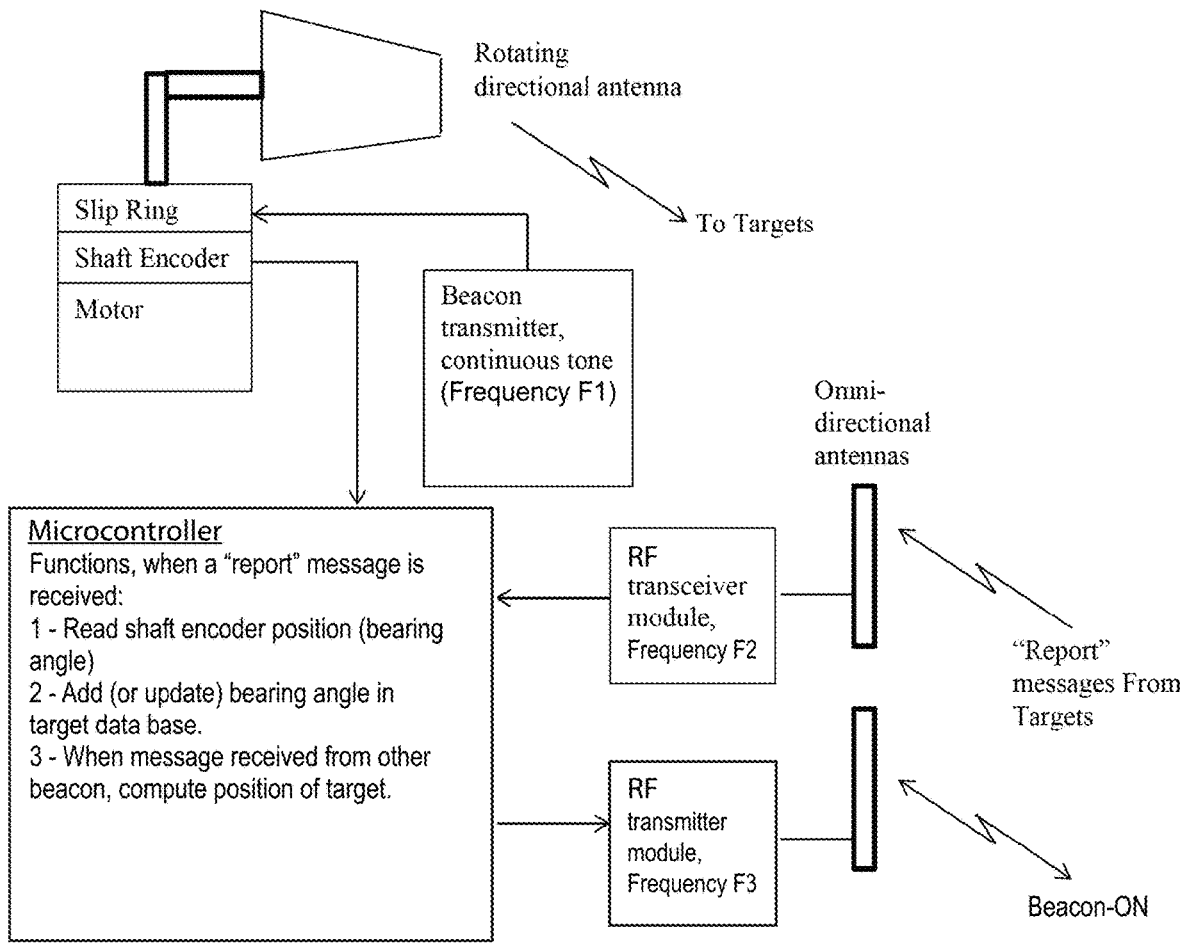
Figure 6: Master Beacon Transmitter System

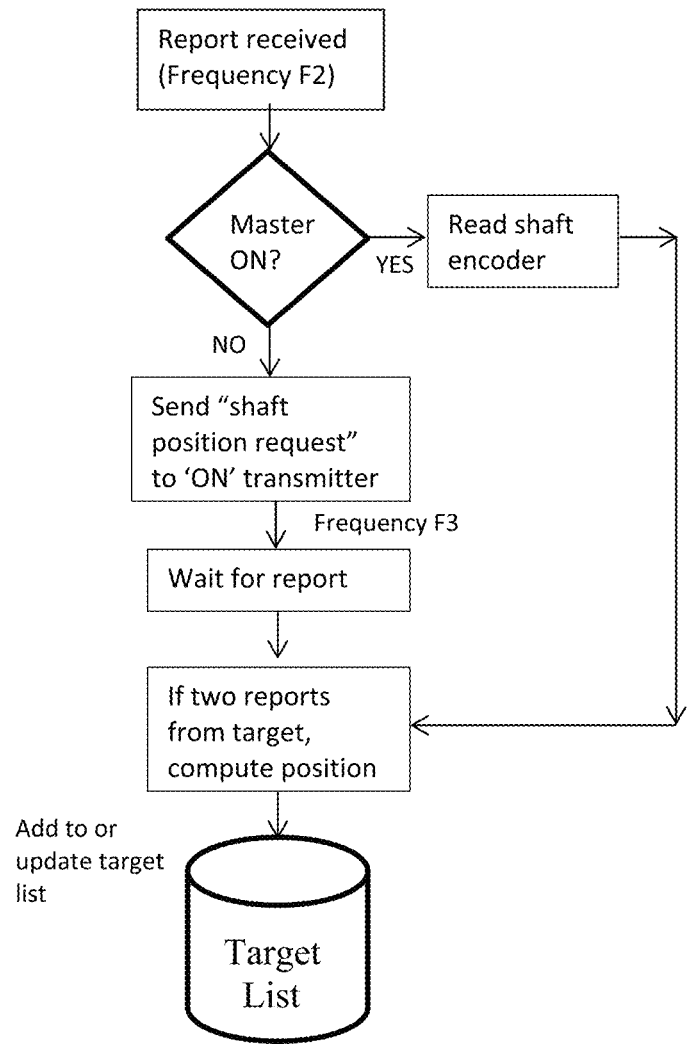
Figure 7A: Master Beacon Transmitter Processing Logic

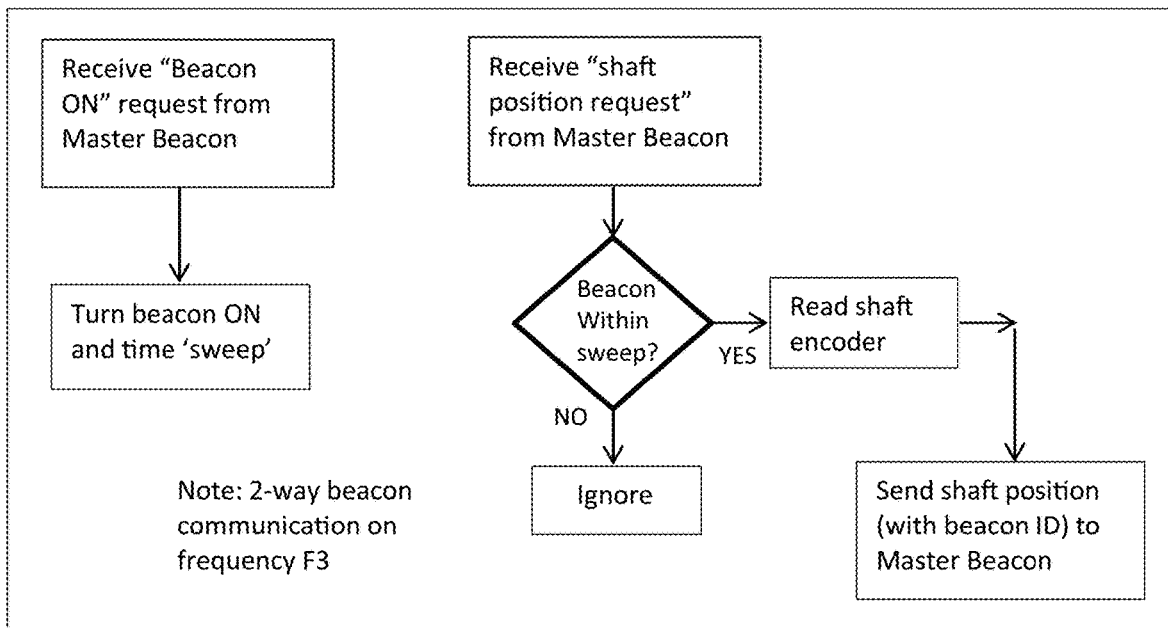
Figure 7B: Non-Master Beacon Transmitter Processing Logic

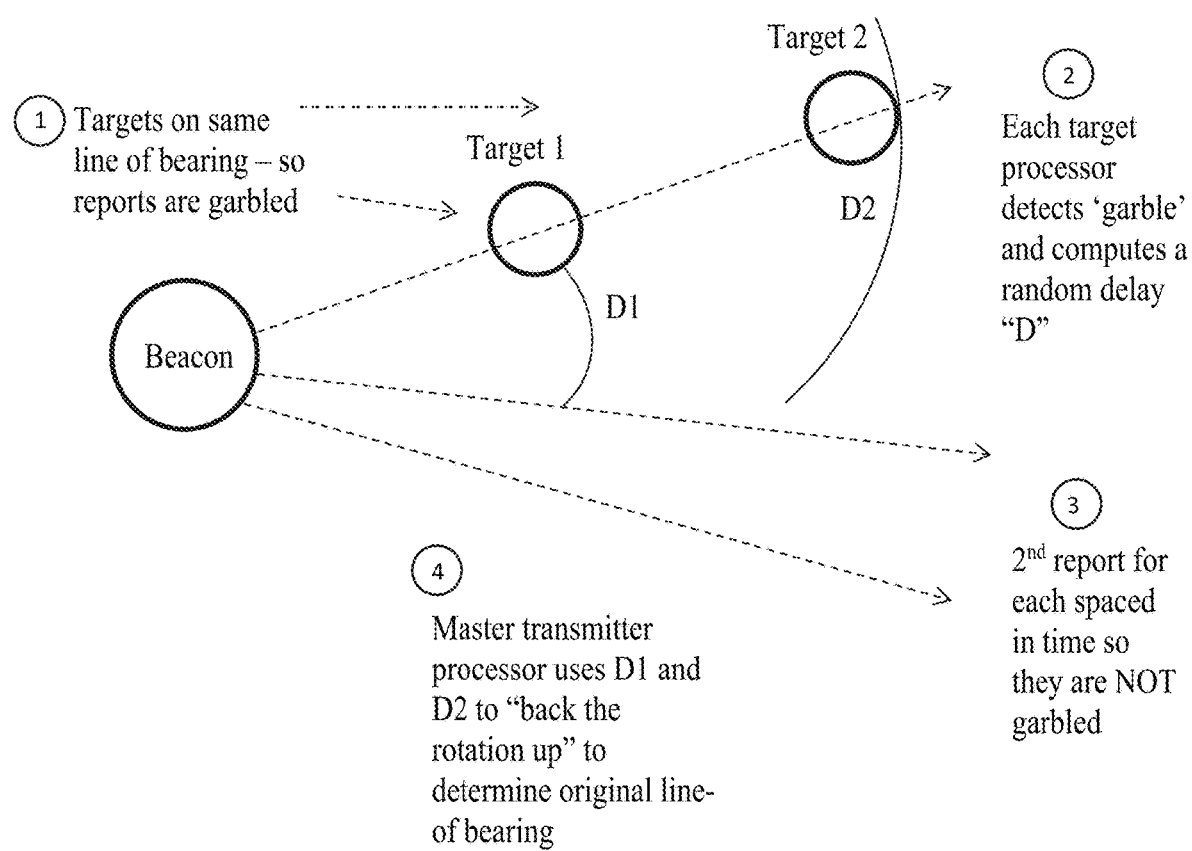
Figure 9: CSMA De-Confliction of Targets On Same Line-of-Bearing

COOPERATIVE TARGET POSITIONING SYSTEM

CROSS-REFERENCE TO RELATED APPLICATIONS

The present application claims the benefit of U.S. Provisional Patent Application No. 63/277,688, filed Nov. 10, 2021, which is incorporated herein by reference in its entirety and for all purposes.

FIELD

The technology relates to radio frequency, or acoustic, direction finding, and more particularly to a target positioning system.

BACKGROUND

Various techniques are known for determining position of a target. A common technique is to receive a transmitted signal at two or more receiver station positions using directional receiver (e.g., an RF beam antenna) to determine the azimuth angles of the transmitter relative to the receiver station positions, and to calculate the transmitter position using triangulation. See for example:
https://www.airfinder.com/blog/indoor-positioning-system
https://www.bitbrain.com/blog/indoor-positioning-system
https://www.tandfonline.com/doi/pdf/10.3846/1392-1541.2009.35.18-22
https://marvelmind.com/

BRIEF DESCRIPTION OF THE DRAWINGS

FIG. 1 is an example block diagram of a system to determine the line-of-bearing of a "cooperative" target, relative to the position of a rotating beacon.

FIG. 2 shows an example position calculation by triangulation.

FIG. 3 shows a multi-target positioning system, using multiple rotating beacons.

FIG. 4 is a block diagram of the Target system.

FIG. 5 is a flowchart of the Target system processing logic.

FIG. 6 is a block diagram of the Beacon Transmitter system.

FIGS. 7A and 7B are flowcharts of the Beacon system processing logic.

FIG. 9 describes algorithm for de-confliction of targets on the same bearing angle from a beacon transmitter.

DETAILED DESCRIPTION OF NON-LIMITING EMBODIMENTS

Figure 8A:
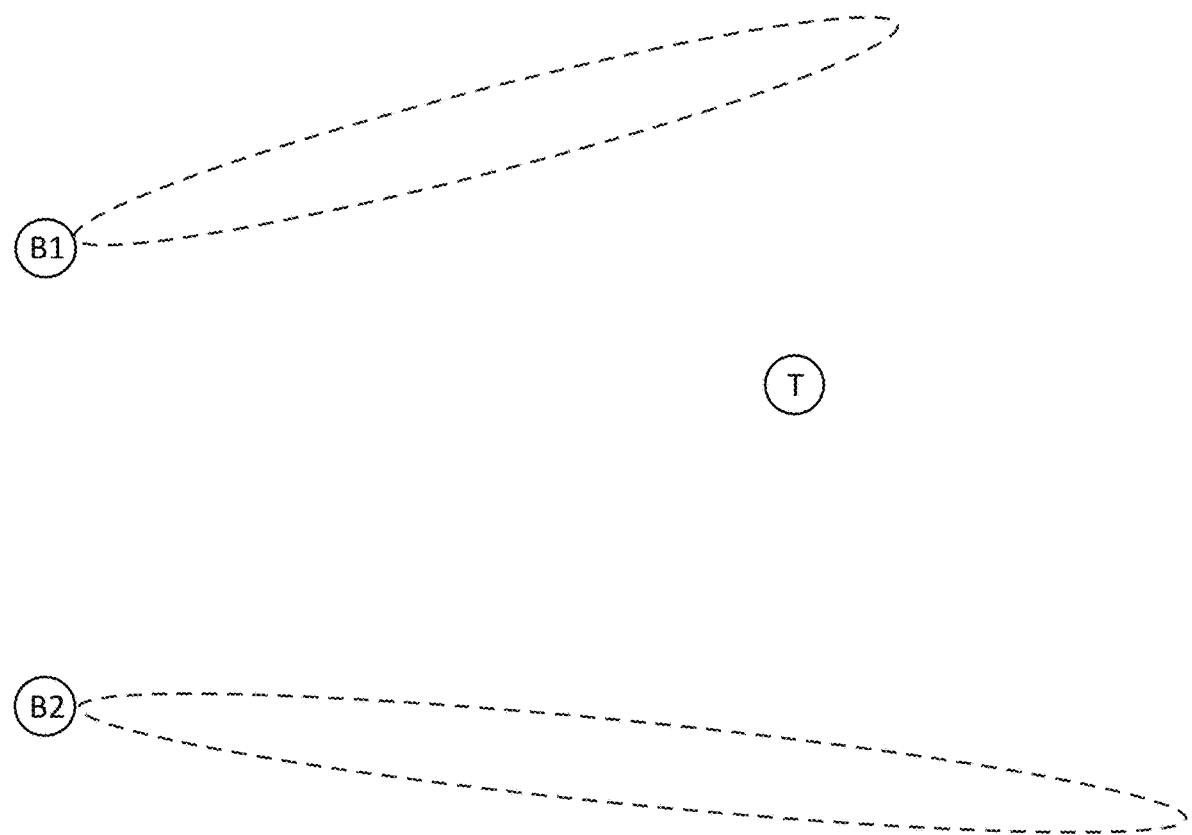
FIGS. 8A-8H together are a flip chart animation showing an example embodiment in operation.
Figure 8B:
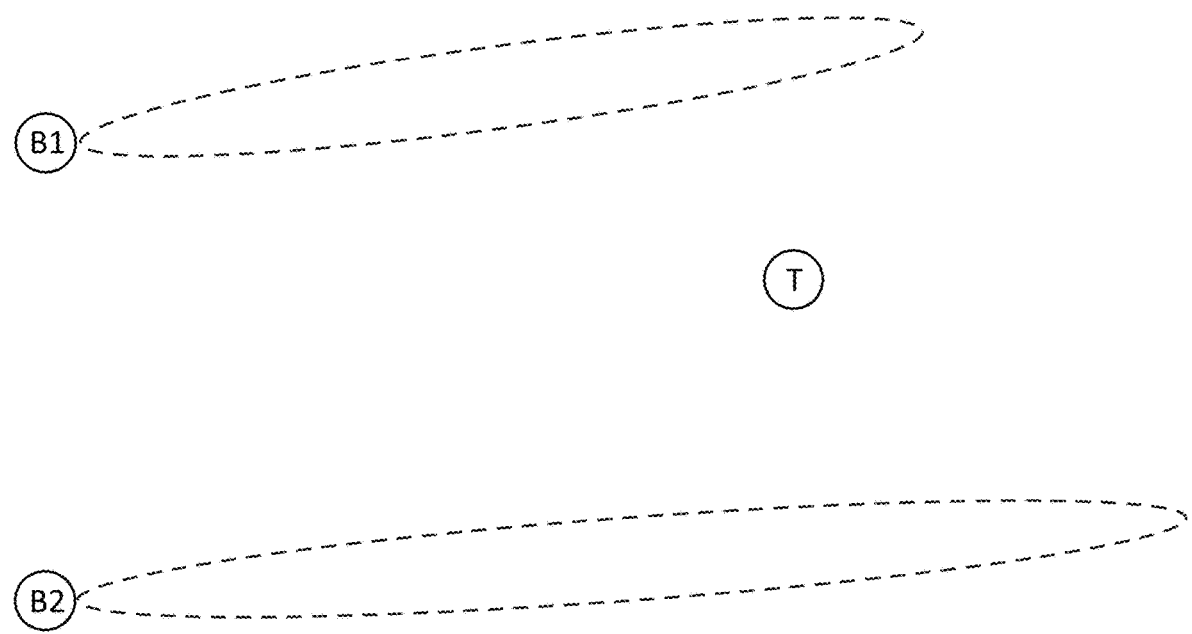
Figure 8C:
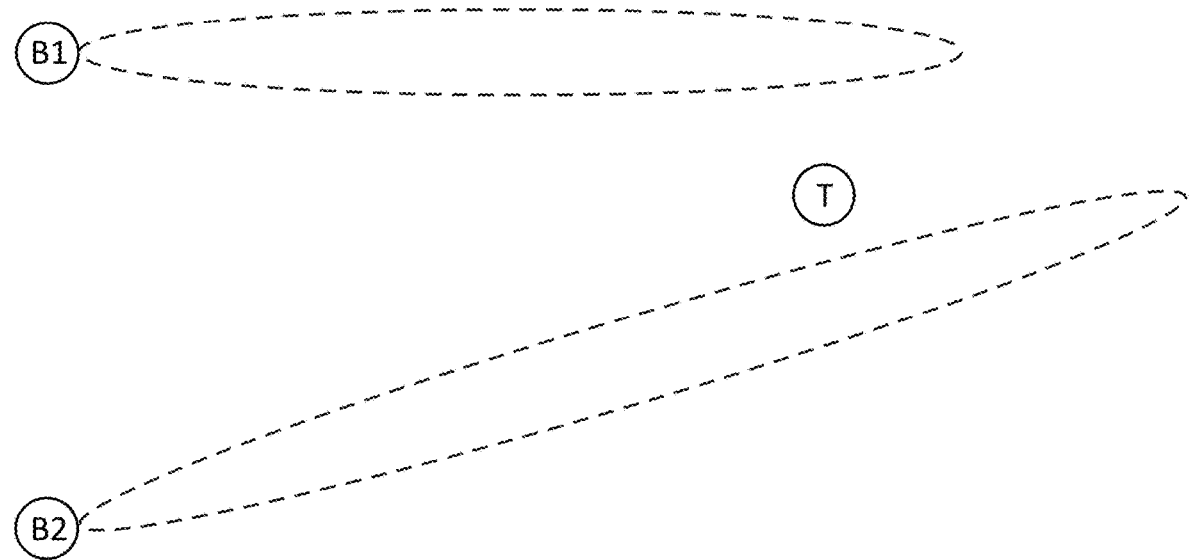

This system provides a way to determine angle of bearing relative to a beacon transmitter with a rotating directional antenna. The angle of bearing is measured to a "cooperative" target.

As FIG. 1 shows, an example system includes a beacon transmitting station and a cooperative target. In this context, the target is "cooperative" in that the target is equipped with a mechanism that cooperates with the beacon station to transmit a report in response to received characteristics of the transmitted beacon signal.

FIG. 1 shows that a beacon transmitting station in one embodiment contains these elements:
Beacon transmitter that transmits a 'beacon' signal, which can be a single-frequency tone such as an RF tone (frequency F1 below)
beam or directional antenna having for example a highly directional radiation pattern such as shown in the Smith chart of FIG. 1, as one example.
a mechanism for rotating the directional radiation pattern of the beacon transmitter, e.g., by mechanically rotating the beam or directional antenna.
Angular shaft encoder that detects the angular position of the radiation pattern of the directional antenna, i.e., the line-of-bearing or azimuth of the directional antenna.
Receiver with omni-directional antenna (frequency F2 below)
Receiver/transmitter with omni-directional antenna (frequency F3 below) for communication with other beacon transmitters
Processor and associated non-transitory memory device storing program instructions which perform angle determination when executed by the processor.

The beacon transmitter applies the beacon signal to the rotating directional antenna. The mechanism for rotating the directional antenna in one embodiment is a motor or other mechanical mechanism that continually rotates the directional antenna at a constant angular rate, although other embodiments could use a beamforming strip line or other antenna with an electronically adjustable angle and no moving parts. In one embodiment, the angular shaft encoder or other mechanism detects or otherwise determines the current angular position of the major lobe of the rotating directional antenna. Rotation does not have to be 360 degrees—in other embodiments, the beacon transmitting antenna can be reciprocally swept through the space occupied by the target. In one embodiment, the beacon transmitter sweeps its directional radiation pattern in a single (e.g., azimuthal or elevational) dimension; in other embodiments, the beacon transmitter sweeps its directional in more than one dimension (e.g., both azimuthal and elevational).

In one embodiment, the beacon transmitting station further includes an omnidirectional antenna that receives report signals from the target on a different frequency than the beacon transmitter transmits (e.g., frequency F2). The Beacon Transmitter system, and its processing logic, are described in FIGS. 6, 7A and 7B.

The FIG. 1 system further includes a cooperative target comprising:
Beacon receiver, with omni-directional receiving antenna (frequency F1)
Frequency F2 transmitter, with omni-directional antenna
Processor for maximum-detect and "report" message formatting.

The Target system, and its processing logic, are described in FIGS. 4 and 5.

As the beacon antenna rotates, the cooperative target detects the signal strength of the beacon signal on frequency F1. As the beacon transmitting antenna rotates to sweep its major lobe through the target, the target will detect a maximum signal strength of the beacon signal. The target responds to detection of the maximum signal strength of the beacon signal by immediately transmitting a "report" message. In one embodiment, the target acts as a transponder to report its ID in response to the received beacon signal. The "report" message in one embodiment consists of a target ID, e.g., four bytes which identify the target, followed by four bytes of microseconds-of-report-delay, followed by optional metadata (data pertinent to the target, such as temperature or vital health signs). The target transmits this report message on frequency F2 over its omnidirectional antenna for reception by the beacon transmitter's omnidirectional antenna. In one embodiment, the beacon transmitter can record the azimuth of its directional antenna and the reporting target ID at the instant the beacon transmitter receives the target's report message.

The time delay from the target to the beacon's omnidirectional receiving antenna is assumed to be a predetermined known fixed time delay and is used to by the beacon transmitter refine the bearing angle. In addition, the maximum detection characteristics of the target can be taken into account by the beacon transmitting station's processor in determining the bearing angle. In particular, the target in one embodiment may not be able to detect the maximum of the received beacon signal until the RSSI (received signal strength indicator) value of the received beacon signal begins to decrease. In other calibrated embodiments, the target can transmit its ID when it receives a signal from the beacon transmitter having a received signal strength in excess of a maximum threshold level.

A large number of fixed or moving targets can be accommodated. In one embodiment, the beacon transmitter is assumed to be fixed to a known location, and ceiling-mounted, anticipated to be about the size of a smoke detector. The "cooperative target" is intended to be small and affixed to an item to be tracked.

As FIG. 2 shows, the Cooperative Target Positioning System (CTPS) uses this angle-determination technique to triangulate and calculate the absolute position of one or more targets. The radio transmitter to be located is a "cooperative target", which emits a radio signal when the signal from a rotating beacon transmitter is pointed at the target. In one embodiment, the target thus comprises a transponder including a radio receiver and a radio transmitter (i.e., a radio transceiver) that detects an RF signal of a particular frequency (and possibly carrying particular address or other information) and in response to such detection, emits a responsive report signal that includes for example its identifier. When the rotating beacon receives the signal from the cooperative target then it can determine the bearing or direction to the target. Such bearing or direction could be a compass direction, relative to an arbitrary polar coordinate reference, etc. For example, the bearing or direction to the target can be determined based on where the beacon's transmission directionality rotated at the instant of receipt of the responsive signal from the cooperative target (as corrected for timing of the time-of-flight from the beacon to the target and from the target back to the beacon). When this is done for at least two beacons, the system can determine the position of the target by triangulation from the beacon locations. Example targets are:

Warehouse pallets
Fire fighters in a smoke-filled space
Shopping carts
Industrial robots
Vehicles or drones Position determination is done as follows: with the positions of the beacon transmitter known, the position of the target is known, with accuracy determined by the resolution of the angle measurements of the bearing or direction. In one embodiment, this resolution depends on the resolution of the angular shaft encoder on the shaft that corresponds to the direction of the directional antenna. A 16-bit encoder is sufficient for 1 cm accuracy over a 100 meter range. At least two beacon transmitters must be utilized, to determine target location.

Rotation rate of the beacons determines the maximum speed at which the target can move and still have its position resolved. With beacons rotating independently, after one beacon transmitter receives a bearing "report" message, the position can only be calculated after the "report" from the second beacon transmitter has been received. This may inject a delay of an entire rotation period, with an average delay of one-half a rotation period. Assuming a beacon rotation rate of 500 Hz, and assuming that the target moves 10 cm between the bearing-fix from one transmitter and the bearing-fix of the second transmitter, and also assuming that the delay is the maximum of one rotation (2 ms) then the target covers 10 cm in 2 ms, or 50 meters/second.

Beacon stations and targets described above are combined as shown in FIG. 3, to implement the CTPS multi-target positioning system. An additional link (frequency F3 below) is added (with fixed omni-directional antennas) for communication between the beacon transmitters. The current embodiment uses a single beacon frequency (F1), but other embodiments may use a separate frequency for each beacon, with the targets containing receivers for each beacon.

Figure 8D:
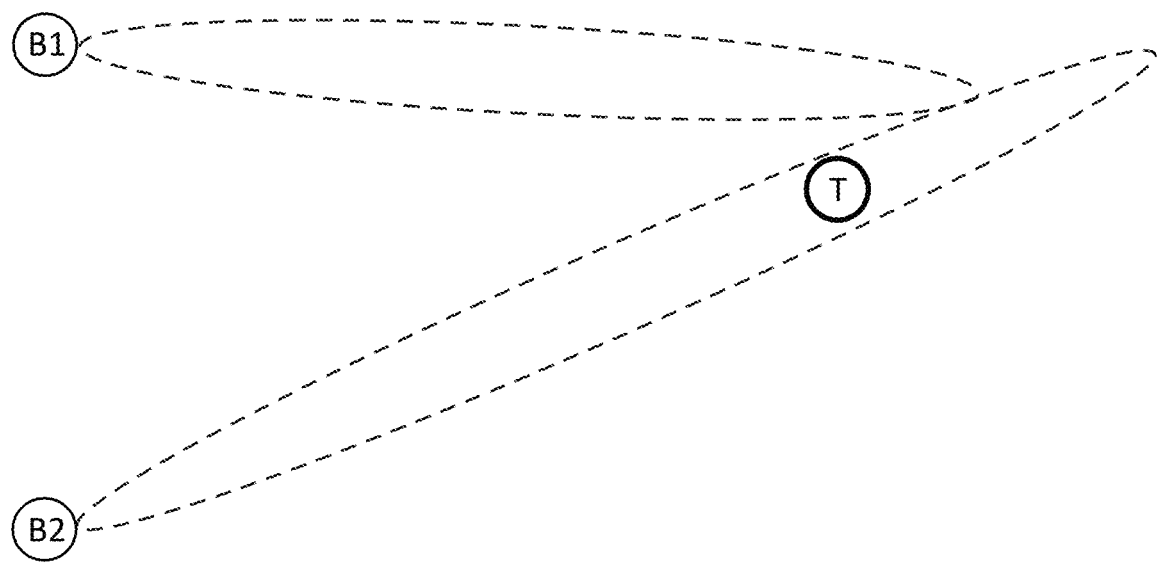

Both or all beacon stations rotate continuously, but only one beacon is radiating at a time. This provides for a single beacon frequency, F1. Which beacon is "ON" is directed by beacon transmitter #1, which sends an "ON" command to each beacon in turn. Each beacon turns off after a single rotation (or "sweep"). The repeating cycle is: transmitter #1 does a sweep and then commands the next beacon "ON" for a sweep, and then the next beacon, until each has performed a sweep. Each target produces a "report" message when maximum signal strength is detected, for each beacon station. This is shown in a flip chart animation of FIGS. 8A-8H (you can view this flip chart animation by pressing "page down" on your browser while looking at an appropriately sized copy of this patent or patent publication). In FIG. 8A, beacon B1 sweeps is directional lobe or beam in a clockwise direction, while beacon B2 sweeps its directional lobe or beam in a counterclockwise direction. FIG. 8D shows the directional lobe or beam of beacon B2 directed at the target, which responds (FIG. 8E) with a report including its identifier. FIG. 8F shows the lobe or beam of beacon B1 being directed to the target, which responds (FIG. 8G) with a corresponding report.

Figure 8E:
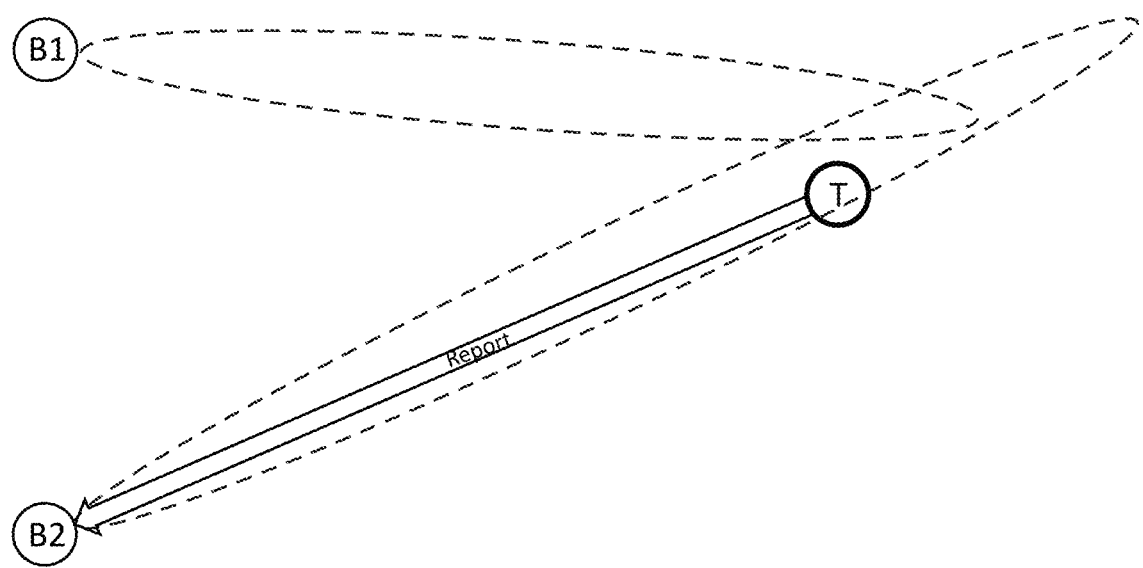
Figure 8F:
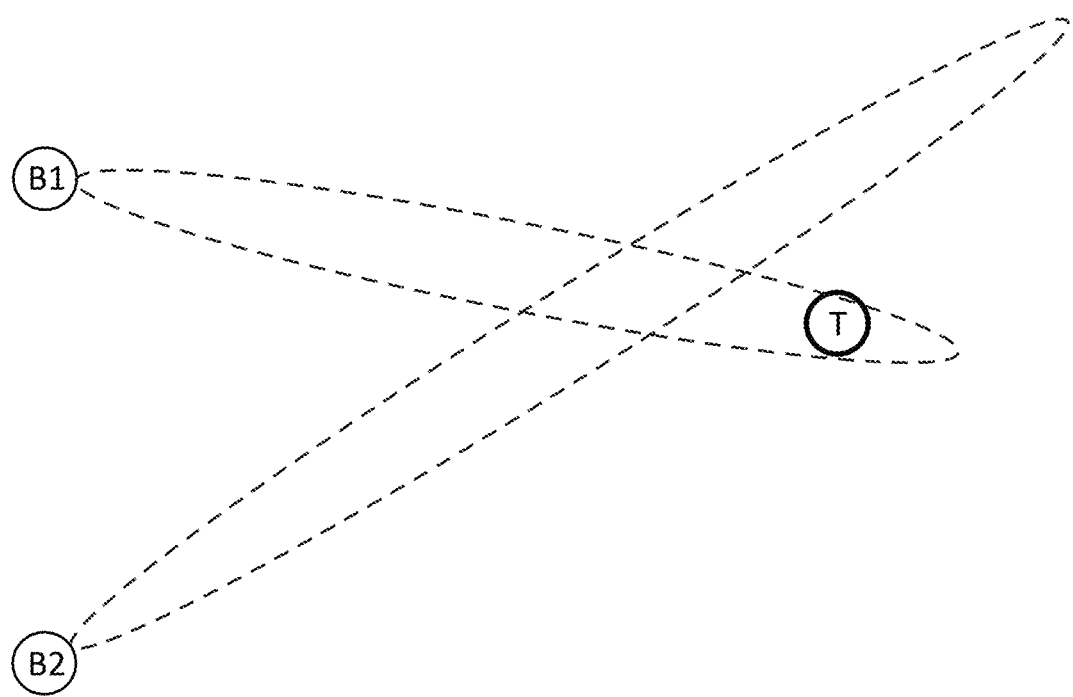
Figure 8G:
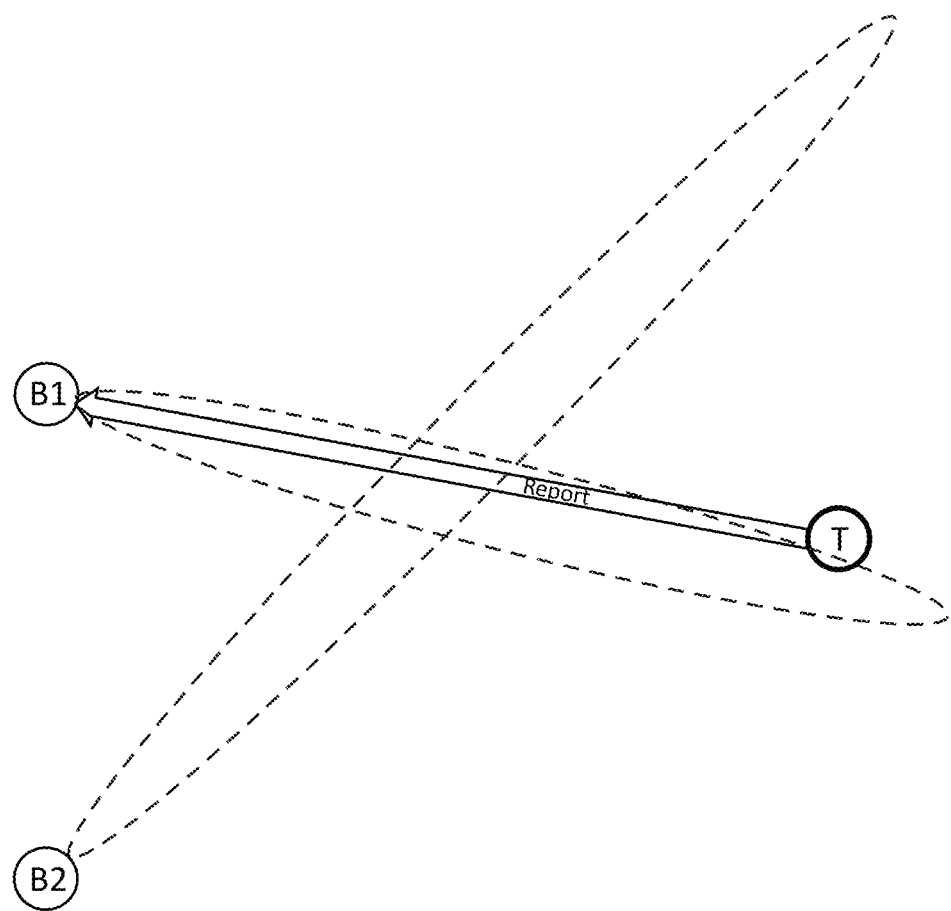
Figure 8H:
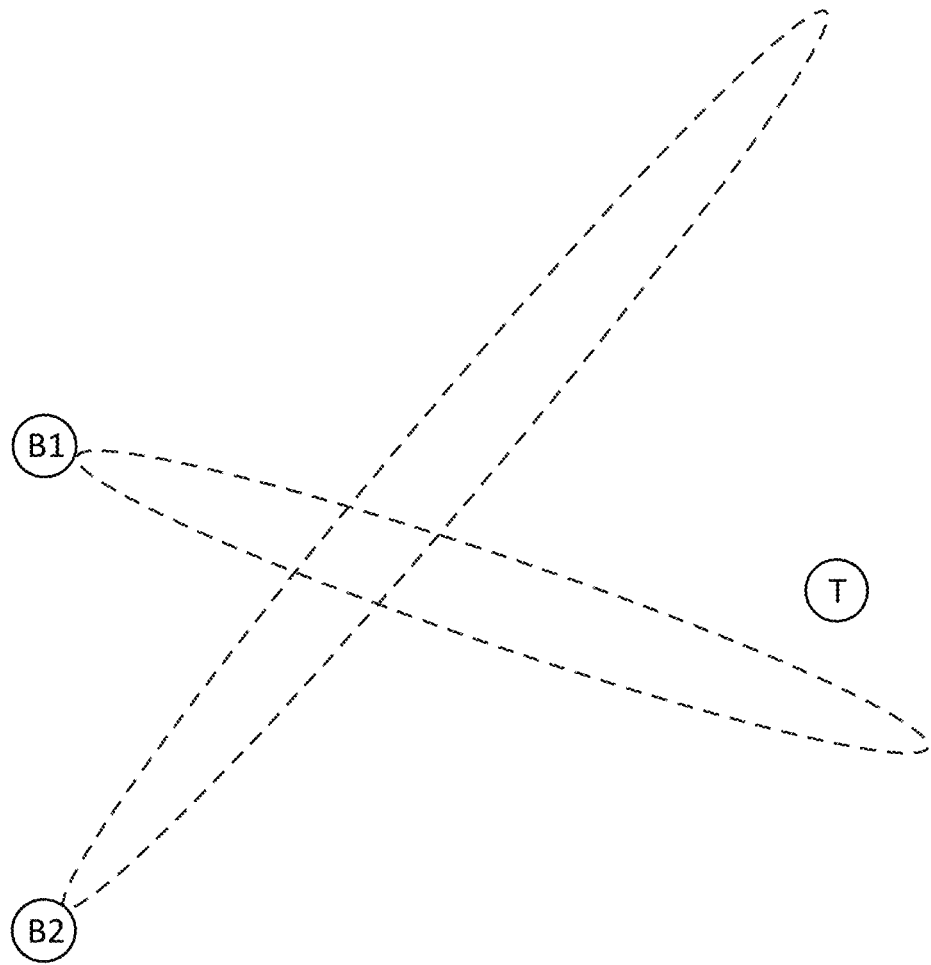

One can see from the flip chart animation that beacon 1 detects the target's report of FIG. 8G and beacon 2 detects the target's report of FIG. 8E. In one embodiment, the directionality of the transmission pattern the beacons work for both transmission and reception, to enable each beacon to distinguish between reports the target sends in response to its own signal from reports the target sends in response to signals of other beacons. In other embodiments, the beacons may transmit their own identifier which the target includes in its responsive report, thereby allowing each beacon to distinguish which reports are for it and which reports are for other beacons. In still other embodiments, the target may include multiple transponders operating at different frequencies, and each beacon transmits on a respective frequency different from the operating frequency(ies) of the other beacon(s) to permit each beacon to determine whether a target response is for it or for another beacon.

All "report" messages are received by beacon station 1, which maintains a target list. If beacon station 1 is "ON" then it reads its local shaft encoder and associates the bearing angle with the target. If another station is "ON", station 1 request that station's current shaft encoder value (bearing angle) and associates that value with the target. When two or more reports for a target have been received, station 1 can compute the position of that target.

Beacon station 1 may, optionally, transmit the computed position of a target back to the target.

If two or more targets are at the same bearing angle from a beacon station their 'report' messages will be garbled. There are two techniques for de-conflicting such targets to determine their common bearing angle. The current embodiment uses a third beacon placed such that targets in-line to other beacons will not be in-line for it. Another embodiment, in cases where only two beacons are practical, uses a CSMA (Carrier-Sense Multiple Access) technique, as shown in FIG. 9. With that technique, each target detects that its report message is garbled by interference from another target, at which time the target processor calculates a random delay value. When that delay expires the target processor produces another "report" message. Ideally, the in-line targets will not conflict on the re-try message. However, if they do the processor can compute another delay and "try again later". When beacon station #1 eventually receives the non-garbled re-transmitted report messages it can subtract the rotation of the beacon during the delay to determine the "original" report transmission time and shaft encoder (bearing) angle. To do this, beacon station #1 must "know" the rotation rate of each other beacon. This is determined at power-up.

One example embodiment of the target hardware uses the Analog Devices 8318 wideband receiver chip. It converts received RF energy to a voltage, indicating received signal strength (RSSI). A filter is applied to restrict the RSSI response to only the beacon signal. A number of small real time processors are available for use on the target. Accurately determining beacon max-strength may use spline techniques for interpolating between sample points.

In one embodiment, the beacon transmitter uses an ADF4351 voltage-tuned transmitter and a printed-circuit YAGI antenna. Slip-rings are used for antenna rotation. Frequencies other than the beacon (F2, F3) are implemented by RF modules which can send and receive sequences of ASCII bytes.

Frequencies F1-F3 are radio-frequency, in one embodiment. They could also be acoustic and operate in air or under water.

For radio-frequency beacon transmitters, a reasonable specification for the beacon antenna would be for the main lobe to have a 3 dB drop-off at an angle of +/−20 degrees, for a beam width of 40 degrees. Side- and back-lobes should be 10 dB below peak magnitude.

While the embodiments above use two or more rotating Yagi antennas to sweep a narrow beam across the target, other embodiments could use conventional microstrip beamforming techniques such as those found in 802.11ac or other Wi-Fi transceivers. In such alternative embodiments, the directionality of the beams can be determined by relative phase shift control signals applied to the beamforming microstrip components.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A method of detecting a position of a cooperative target comprising:

(a) sweeping the target with a first directional beacon signal emanating from a first beacon position;
(b) sweeping the target with a second directional beacon signal emanating from a second beacon position different from the first beacon position;
wherein the sweeping (a), (b) are each performed by continuously rotating a directional antenna while transmitting radio frequency signals;
(c) detecting reports the target emits in response to the first and second swept beacon signals; and
(d) calculating a triangulated position of the target in response to the detected reports.

2. The method of claim 1 wherein the target comprises a transponder.

3. The method of claim 1 wherein beacon signals comprise radio frequency signals.

4. A method of detecting a position of a cooperative target comprising:

(a) sweeping the target with a first directional beacon signal emanating from a first beacon position;
(b) sweeping the target with a second directional beacon signal emanating from a second beacon position different from the first beacon position;
(c) detecting reports the target emits in response to the first and second swept beacon signals; and
(d) calculating a triangulated position of the target in response to the detected reports,
wherein the sweeping (a), (b) each includes rotating a directional antenna while determining a direction of a major lobe of the directional antenna, and the calculating (d) comprises triangulating based on the determined directions.

5. A method of detecting a position of a cooperative target comprising:

(a) sweeping the target with a first directional beacon signal emanating from a first beacon position;
(b) sweeping the target with a second directional beacon signal emanating from a second beacon position different from the first beacon position;
(c) detecting reports the target emits in response to the first and second swept beacon signals; and
(d) calculating a triangulated position of the target in response to the detected reports,
wherein the sweeping (a), (b) comprises beamforming.

6. A method of detecting a position of a cooperative target comprising:

(a) sweeping the target with a first directional beacon signal emanating from a first beacon position;
(b) sweeping the target with a second directional beacon signal emanating from a second beacon position different from the first beacon position;
(c) detecting reports the target emits in response to the first and second swept beacon signals; and
(d) calculating a triangulated position of the target in response to the detected reports,
wherein the target is configured to employ a CSMA (Carrier-Sense Multiple Access) technique, and to compute a random reporting delay and re-send a report when that delay expires, the amount of delay being contained in the report.

7. A method of detecting a position of a cooperative target comprising:

(a) sweeping the target with a first directional beacon signal emanating from a first beacon position;
(b) sweeping the target with a second directional beacon signal emanating from a second beacon position different from the first beacon position;

(c) detecting reports the target emits in response to the first and second swept beacon signals; and (d) calculating a triangulated position of the target in response to the detected reports, further including the second beacon position reporting to the first beacon position, the antenna bearing corresponding to the moment the second beacon position received a report from the target.

8. A system for detecting a position of a cooperative target comprising:
   a first transmitter disposed at a first beacon position, the first transmitter configured to sweep the target with a first directional beacon signal;
   a second transmitter disposed at a second beacon position different from the first beacon position, the second transmitter configured to sweep the target with a second directional beacon signal;
   at least one receiver configured to detect reports the target emits in response to the first and second swept beacon signals; and
   at least one processor connected to the at least one receiver, the at least one processor configured to calculate a triangulated position of the target in response to the detected reports,
   wherein the sweeping (a), (b) comprises beamforming.

9. The system of claim 8 wherein the target comprises a transponder.

10. The system of claim 8 wherein beacon signals comprise radio frequency signals.

11. A system for detecting a position of a cooperative target comprising:
    a first transmitter disposed at a first beacon position, the first transmitter configured to sweep the target with a first directional beacon signal;
    a second transmitter disposed at a second beacon position different from the first beacon position, the second transmitter configured to sweep the target with a second directional beacon signal;
    at least one receiver configured to detect reports the target emits in response to the first and second swept beacon signals; and
    at least one processor connected to the at least one receiver, the at least one processor configured to calculate a triangulated position of the target in response to the detected reports,
    wherein the first and second transmitters each include a rotating directional antenna that determines a direction of an emanated major lobe therefrom, and the at least one processor is configured to triangulate based on the determine directions.

12. A system of for detecting a position of a cooperative target comprising:
    a first transmitter disposed at a first beacon position, the first transmitter configured to sweep the target with a first directional beacon signal;
    a second transmitter disposed at a second beacon position different from the first beacon position, the second transmitter configured to sweep the target with a second directional beacon signal;
    at least one receiver configured to detect reports the target emits in response to the first and second swept beacon signals; and
    at least one processor connected to the at least one receiver, the at least one processor configured to calculate a triangulated position of the target in response to the detected reports,
    wherein the first and second transmitters each comprise a continually rotating directional RF antenna, and a shaft encoder that detects the rotational direction of the continually rotating directional RF antenna.

13. The system of claim 8 wherein the target comprises a transponder that emits an identification report signal upon detecting a beacon signal.

* * * * *